United States Patent
Camacho et al.

(10) Patent No.: US 10,771,630 B1
(45) Date of Patent: *Sep. 8, 2020

(54) SYSTEMS AND METHODS FOR INTERCEPTING COMMUNICATIONS

(71) Applicant: United Services Automobile Association (USAA), San Antonio, TX (US)

(72) Inventors: Gualberto Camacho, San Antonio, TX (US); David Tuomikoski, San Antonio, TX (US)

(73) Assignee: United States Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/597,651

(22) Filed: Oct. 9, 2019

Related U.S. Application Data

(63) Continuation of application No. 16/039,018, filed on Jul. 18, 2018, now Pat. No. 10,455,092.

(60) Provisional application No. 62/534,587, filed on Jul. 19, 2017.

(51) Int. Cl.
*H04M 3/42* (2006.01)
*H04M 3/54* (2006.01)
*H04M 1/57* (2006.01)

(52) U.S. Cl.
CPC .......... *H04M 3/541* (2013.01); *H04M 1/576* (2013.01); *H04M 3/4211* (2013.01); *H04M 3/42068* (2013.01)

(58) Field of Classification Search
CPC ................................ H04M 3/54; H04M 3/436

USPC ........................................ 379/211.01–211.02
See application file for complete search history.

(56) References Cited

U.S. PATENT DOCUMENTS

| | | | |
|---|---|---|---|
| 6,104,790 | A | 8/2000 | Narayanaswami |
| 7,397,905 | B1 | 7/2008 | Stewart et al. |
| 8,345,835 | B1 | 1/2013 | Or-Bach et al. |
| 8,929,517 | B1 | 1/2015 | Lavian et al. |
| 2008/0152107 | A1 | 6/2008 | Mendiola |
| 2008/0192922 | A1 | 8/2008 | Silver et al. |
| 2009/0016503 | A1 | 1/2009 | Lee et al. |
| 2014/0148125 | A1 | 5/2014 | Langevin et al. |

*Primary Examiner* — Rasha S Al Aubaidi
(74) *Attorney, Agent, or Firm* — Fletcher Yoder, P.C.

(57) ABSTRACT

Tangible, non-transitory, machine-readable media include instructions that cause a processor to receive a first indication that a user is attempting to communicate with a provider, and intercept communication between the user and the provider based on the first indication being received. The instructions also cause the processor to send user information to a provider application server based on the first indication being received, and display a visual interface that establishes communication with the relevant provider department or performs a transaction based on the first indication being received. The instructions further cause the processor to receive a second indication associated with performing the action associated with the provider via the visual interface; and performing the action based on the second indication being received.

20 Claims, 11 Drawing Sheets

US 10,771,630 B1

SYSTEMS AND METHODS FOR INTERCEPTING COMMUNICATIONS

CROSS REFERENCE TO RELATED APPLICATIONS

This application is a continuation of U.S. patent application Ser. No. 16/039,018, filed Jul. 18, 2018, entitled "Systems and Methods for Intercepting Communications," which claims the benefit of U.S. Provisional Application Ser. No. 62/534,587, filed Jul. 19, 2017, entitled "Systems and Methods for Communication Intercept," both of which are hereby incorporated by reference in their entireties for all purposes.

BACKGROUND

The present disclosure relates generally to intercepting a communication to a provider, and more particularly to intercepting the communication and establishing communication with a relevant provider department, authenticating a user, and/or performing a transaction.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Typically, when a user initially communicates with a provider of a good or service (e.g., insurance, finance, utility, communication, entertainment, commerce, security, and the like), the provider will direct the user to an interactive voice response system that uses automated audio prompts to elicit information from the user. The interactive voice response system may then direct the user to an appropriate department of the provider or enable the user to perform a transaction via the interactive voice response system based on the information provided by the user. In many cases, the user communicates with the provider via a mobile electronic device that includes a visual input device, such as a smartphone, wearable device, tablet, and the like. However, these electronic devices may include capabilities that may simplify or provide additional functionality when compared to the interactive voice response system.

BRIEF DESCRIPTION OF THE DRAWINGS

Various aspects of this disclosure may be better understood upon reading the following detailed description and upon reference to the drawings in which.

SUMMARY

Figure 1:
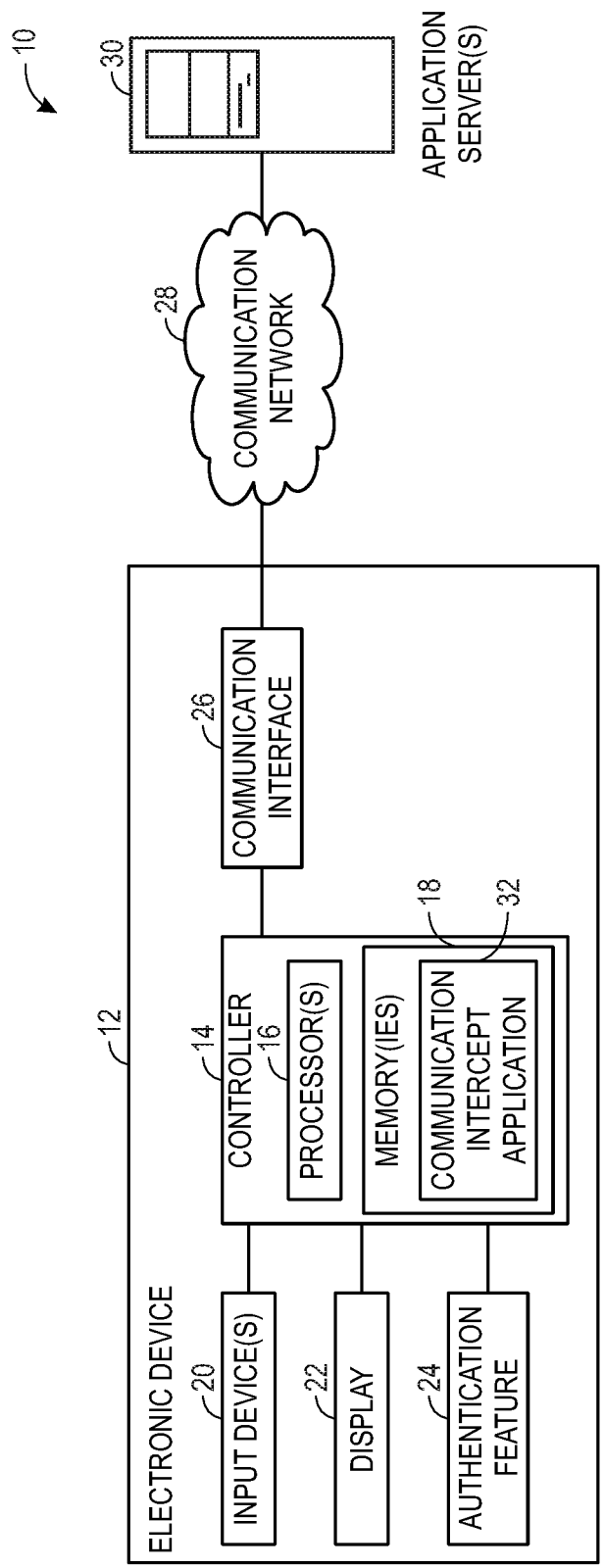
FIG. 1 is a block diagram of a communication intercept system using an electronic device, according to an embodiment of the present disclosure.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates generally to intercepting a communication to a provider, and more particularly to intercepting the communication and establishing communication with a relevant provider department, authenticating a user, and/or performing a transaction. In some embodiments, when the user initiates a voice call with the provider using a mobile electronic device (e.g., a smartphone), a visual interface may be displayed on the electronic device that enables establishing communication (e.g., establishing voice communication via a standard phone call) with the relevant provider department. The visual interface may also enable authenticating the user, for example, by using an authentication feature of the electronic device. In alternative or additional embodiments, the visual interface may enable performing a transaction (e.g., completely via the visual interface), such as the transaction that the user desired to perform when initiating the call. In this manner, establishing communication to the relevant provider department and/or performing the desired transaction may more quickly and efficiently be achieved without tediously navigating through an interactive voice response system. For example, a user may attempt to make a voice call via the smartphone to a bank to transfer funds and the call may be intercepted (e.g., based on identification of the phone number) and a user-interface (e.g., the visual interface) may be activated on the smartphone to facilitate authenticating the user, establishing communication with a relevant provider department, and/or completing the transaction.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As an introduction, FIG. 1 is a block diagram of a communication intercept system 10 using an electronic device 12, according to an embodiment of the present disclosure. The electronic device 12 may include any suitable electronic device that may send a communication to a provider, establish communication with a relevant provider department, authenticate the user, and/or perform a transaction. For example, the electronic device 12 may include a smartphone, wearable device, tablet, a laptop, a personal computer, and the like. The provider may provide any suitable good or service to the user, such as those associated with insurance, finance, utility, communication, entertainment, commerce, security, and the like.

As illustrated, the electronic device 12 includes a controller 14. The controller 14 includes one or more processors 16 and one or more memories 18. The processor(s) 16 (e.g., microprocessors) may execute software programs and/or instructions to send a communication to the provider, establish communication with a relevant provider department, authenticate the user, and/or perform a transaction. Moreover, the processor(s) 16 may include multiple microprocessors, one or more "general-purpose" microprocessors, one or more special-purpose microprocessors, and/or one or more application specific integrated circuits (ASICS), or some combination thereof. For example, the processor(s) 16 may include one or more reduced instruction set (RISC) processors. The memory(ies) 18 may store information such as control software, look up tables, configuration data, etc. In some embodiments, the processor(s) 16 and/or the memory(ies) 18 may be external to the controller 14. The memory(ies) 18 may include a tangible, non-transitory, machine-readable-medium, such as a volatile memory (e.g., a random access memory (RAM)) and/or a nonvolatile memory (e.g., a read-only memory (ROM)). The memory(ies) 18 may store a variety of information and may be used for various purposes. For example, the memory(ies) 18 may store machine-readable and/or processor-executable instructions (e.g., firmware or software) for the processor(s) 16 to execute, such as instructions to send a communication to the provider, establish communication with a relevant provider department, authenticate the user, and/or perform a transaction. The memory(ies) 18 may include one or more storage devices (e.g., nonvolatile storage devices) that may include read-only memory (ROM), flash memory, a hard drive, or any other suitable optical, magnetic, or solid-state storage medium, or a combination thereof.

The electronic device 12 may include one or more input devices 20 communicatively coupled to the controller 14. The input device(s) 20 may include any suitable device that enables the user to send a communication to a provider, establish communication with a relevant provider department, authenticate the user, and/or perform a transaction. For example, the input device(s) 20 may include a touchscreen, dial pad, buttons, dials, a keyboard, a mousing device, a trackpad, a microphone, a retinal scanner, a fingerprint reader, a card reader, and the like.

The electronic device 12 may also include a display 22 communicatively coupled to the controller 14. The display 22 may provide information to the user, for example, to enable the user to send a communication to a provider, establish communication with a relevant provider department, authenticate the user, and/or perform a transaction.

In some embodiments, the electronic device 12 may include an authentication feature 24. The authentication feature 24 may be implemented as hardware, such as a fingerprint reader, a microphone, a retinal scanner, or any other suitable hardware that enables authentication of the user. In one embodiment, the authentication feature 24 may be implemented as software, such as a prompt that enables the user to enter a personal identification number, a password, answer a security question, draw a security pattern, and the like.

The controller 14 may also be communicatively coupled to a communication interface 26. The communication interface 26 may enable the controller 14 to communicate with any suitable communication network 28. For example, the communication interface 26 may enable the controller 14 to communicate with wireless networks (e.g., mobile, WiFi, LAN, WAN, Internet, and the like). In this manner, the communication interface 26 may enable the controller 14 to communicate with, for example, an application server 30. The application server 30 may enable the user to communication with a provider. For example, the application server 30 may belong to the user's insurance company, and enable the user to communicate with an interactive response system, a call center, and/or a representative of the insurance company (e.g., via a communication intercept application 32).

As illustrated, the communication intercept application 32 is stored in the memory(ies) 18. However, it should be understood that the communication intercept application 32 may also be stored in a memory external to the controller 14 or may be defined by separate circuitry. The communication intercept application 32 may be downloaded from the provider and enable the user to send a communication to the provider, establish communication with a relevant provider department, authenticate the user, and/or perform a transaction. In particular, the communication intercept application 32 may enable performing the steps with respect to FIG. 2. The communication intercept application 32 may receive information from an input device 20 of the electronic device 12, such as a touchscreen or dial pad. In some embodiments, the communication intercept application 32 may receive an indication that a user is attempting to communicate (e.g., call) with the provider, and intercept the communication (e.g., by performing certain actions and/or displaying information on the display 22) before enabling the communication. In such embodiments, the communication intercept application 32 may request and receive permission (e.g., from the processor(s) 16) to intercept the communication before enabling the communication. As an example, the processor(s) 16 may use an Android operating system, which may give the communication intercept application 32 the capability to intercept the communication before enabling the communication when requested by the communication intercept application 32.

Figure 2:
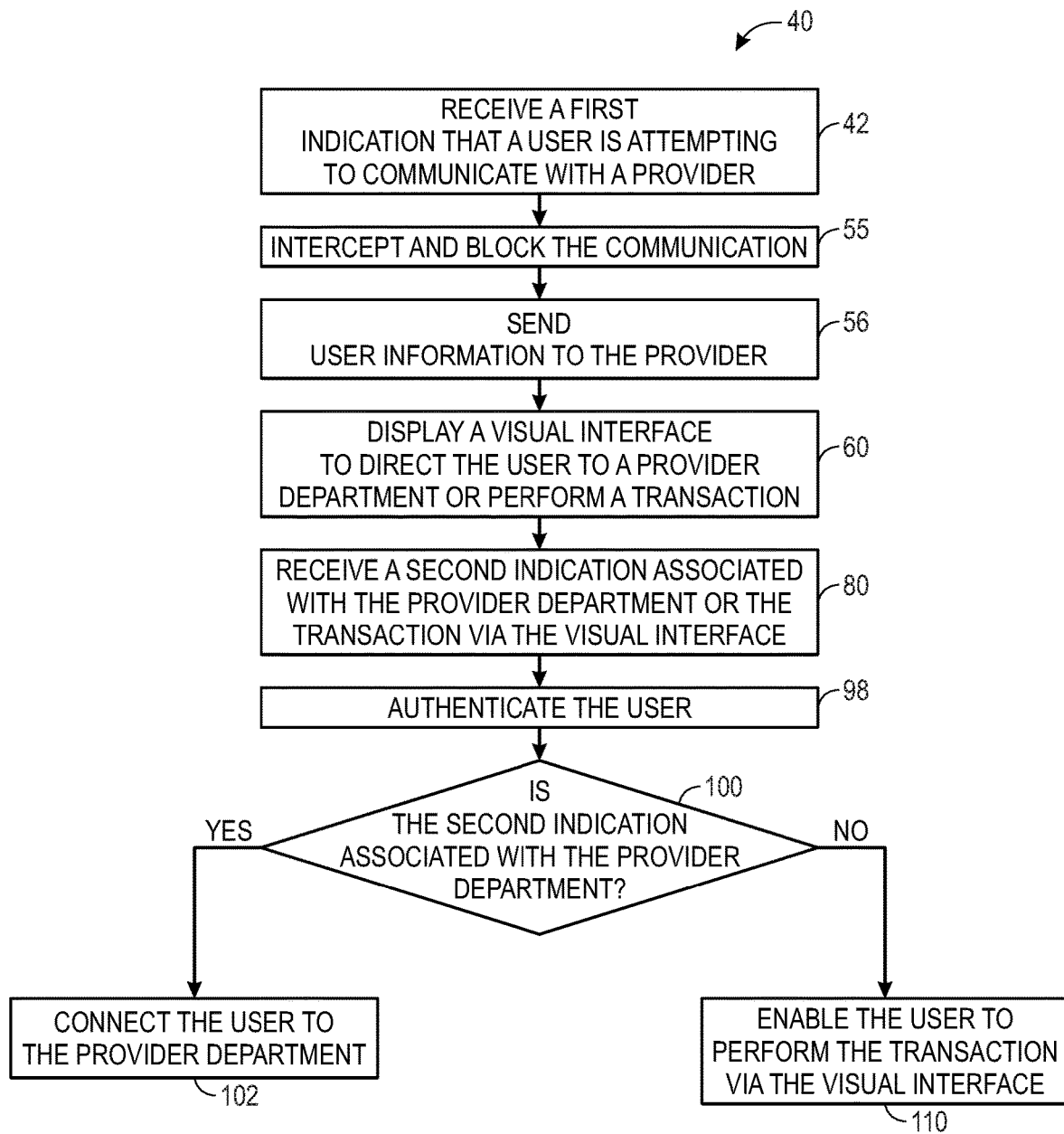
FIG. 2 is a flowchart illustrating a method for intercepting a communication to a provider that may be performed by a controller of the electronic device of FIG. 1, according to an embodiment of the present disclosure.

With this in mind, FIG. 2 is a flowchart illustrating a method 40 for intercepting a communication to a provider that may be performed by the controller 14 of the electronic device 12 of FIG. 1, according to an embodiment of the present disclosure. The method 40 may be performed by any suitable device that may enable a user to send a communication to the provider, establish communication with a relevant provider department, authenticate the user, and/or perform a transaction, such as the controller 14. While the method 40 is described using steps in a specific sequence, it should be understood that the present disclosure contemplates that the described steps may be performed in different sequences than the sequence illustrated, and certain described steps may be skipped or not performed altogether. In some embodiments, the method 40 may be implemented by executing instructions stored in a tangible, non-transitory, computer-readable medium, such as the memory(ies) 18, using a processor, such as the processor(s) 16.

Figure 3:
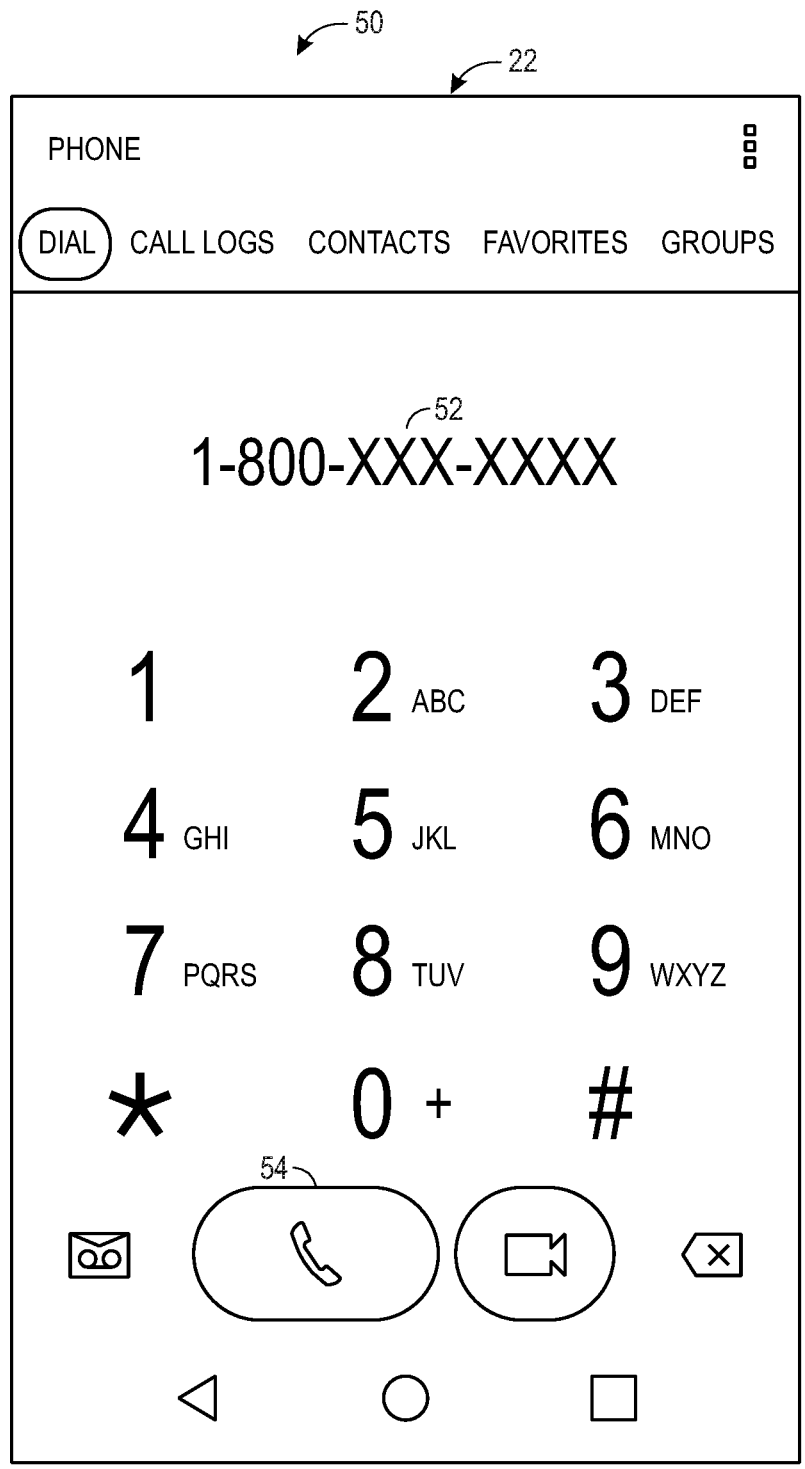
FIG. 3 is an illustration of dial pad displayed on a display of the electronic device of FIG. 1, according to an embodiment of the present disclosure.

As illustrated, the controller 14 receives (process block 42) an indication that a user is attempting to communicate with a provider. Specifically, the controller 14 may receive the indication when the user attempts to communicate with the provider with a telephone system or via a telephone network. FIG. 3 is an illustration of a dial pad 50 displayed on the display 22 of the electronic device 12 of FIG. 1, according to an embodiment of the present disclosure. As illustrated, the user has entered the phone number 52 associated with the provider. The controller 14 may, for example, receive the indication when the user presses the call button 54 after dialing the phone number 52. In another example, the controller 14 may receive the indication when the user attempts to send a text message (e.g., via short message service) via the telephone network.

The controller 14 may then intercept and block (process block 55) the attempted communication by holding, suspending, or otherwise preventing the communication from being sent or a call (e.g., via a telephone network) from being made. For example, a phone number may be identified (e.g., from an index of providers stored in the memory(ies) 18) as corresponding to a provider that enables interactions with features in accordance with present embodiments and the actual call may then be blocked in conjunction with diverting to a more efficient interactive process. In this manner, the presently disclosed techniques are directed at a specific improvement to computer-related technology, beyond use of a computer in its ordinary capacity. Specifically, the controller 14 may intercept and block communications from a user and instead provide a visual interface that enables establishing communication with a desired provider department or perform a desired transaction. Thus, the user may more quickly and efficiently achieved his or her desired results without tediously navigating through, for example, an interactive voice response system.

The controller 14 sends (process block 56) user information to the provider. For example, the controller 14 may send device identification information (e.g., a device identification number, the phone number associated with the electronic device 12, an automatic number identification, and the like) associated with the electronic device 12, member identification information (e.g., a member identification number that the provider issues to the user), information associated with the communication intercept application 32, and the like. The user information may enable the provider to, for example, determine the identity of the user. In some embodiments, the user information may be obtained from the intercepted communication.

Figure 4:
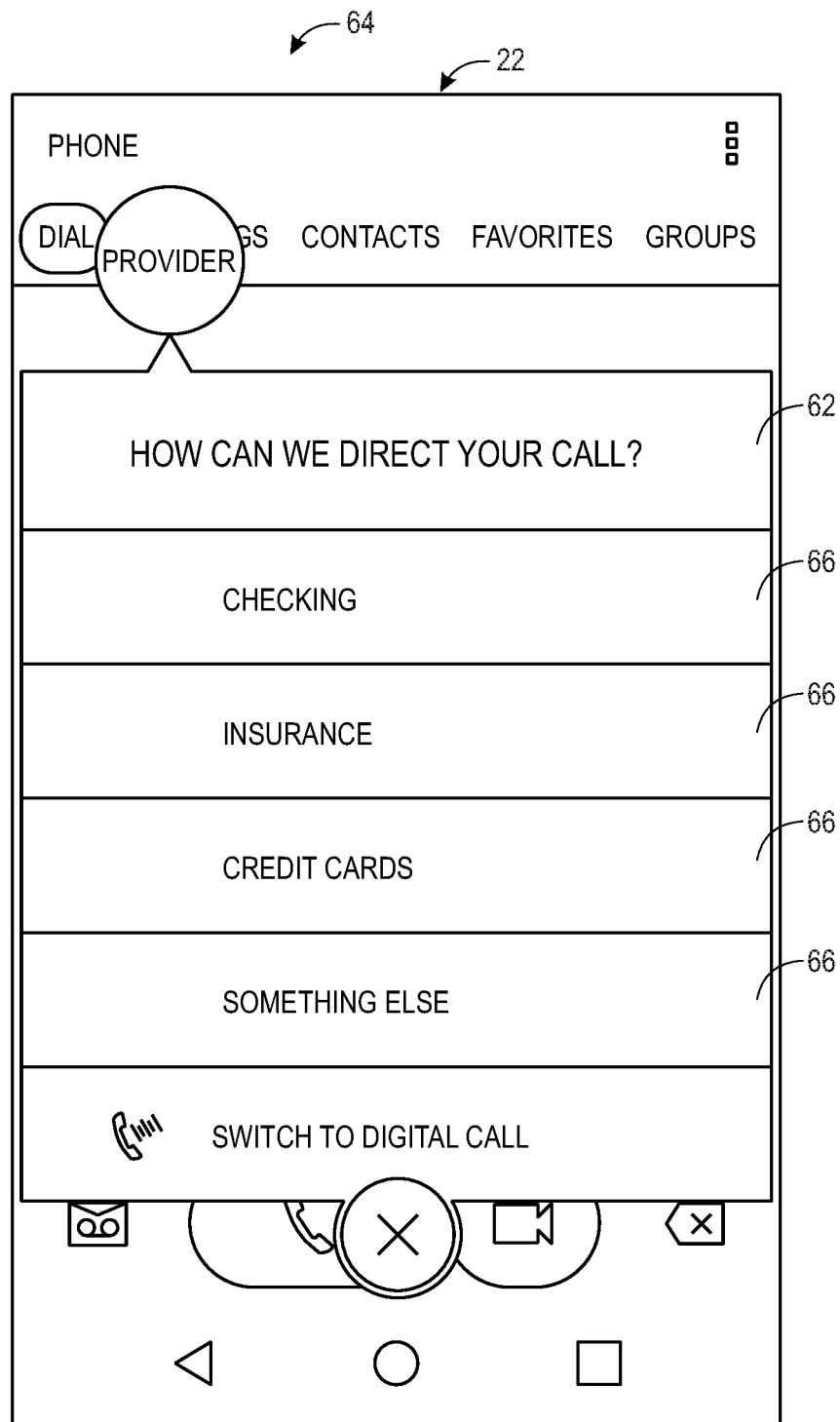
FIG. 4 is an example page of a visual interface displayed on the display of the electronic device of FIG. 1 that enables establishing communication with a relevant provider department or performing a transaction, according to an embodiment of the present disclosure.

The controller 14 then displays (process block 60) a visual interface that enables performing an action associated with the provider. In particular, the visual interface may enable establishing communication (e.g., establishing voice communication via a standard phone call) with a relevant provider department or performing a transaction. The visual interface may include a graphical user interface that enables the user to select an option from a set of options. FIG. 4 is an example page 62 of a visual interface 64 displayed on the display 22 of the electronic device 12 of FIG. 1 that enables establishing communication with a relevant provider department or performing a transaction, according to an embodiment of the present disclosure. As illustrated, the visual interface 64, and thus the page 62 of the visual interface 64, may be overlaid on top of the dial pad 50 of FIG. 3. The page 62 may include a set of options 66 that the user may select from to establish communication with the relevant provider department or perform a transaction. In particular, the set of options 66 include "Checking," "Insurance," "Credit Cards," and "Something Else." It should be understood that any suitable options related to the business of the provider may be included. The associated provider departments may include a checking department, an insurance department, a credit card department, and a call center department. It should be understood that any suitable departments related to the options may be included. The relevant provider department may include any suitable provider department that the user may desire to contact. The transactions may include any suitable transactions related to the options and the associated accounts that are contemplated, such as transferring funds in checking accounts, changing insurance policies, making a payment to a credit card account, and the like.

For example, the user may desire to transfer funds from or to a checking account that the provider manages. As such, the user may desire to establish communication with a checking account or funds transfer department of the provider to perform the funds transfer transaction. The user may additionally or alternatively desire to perform the funds transfer transaction using the visual interface 64 (e.g., without establishing voice communication via a standard phone call with the checking account or funds transfer department of the provider).

Figure 5:
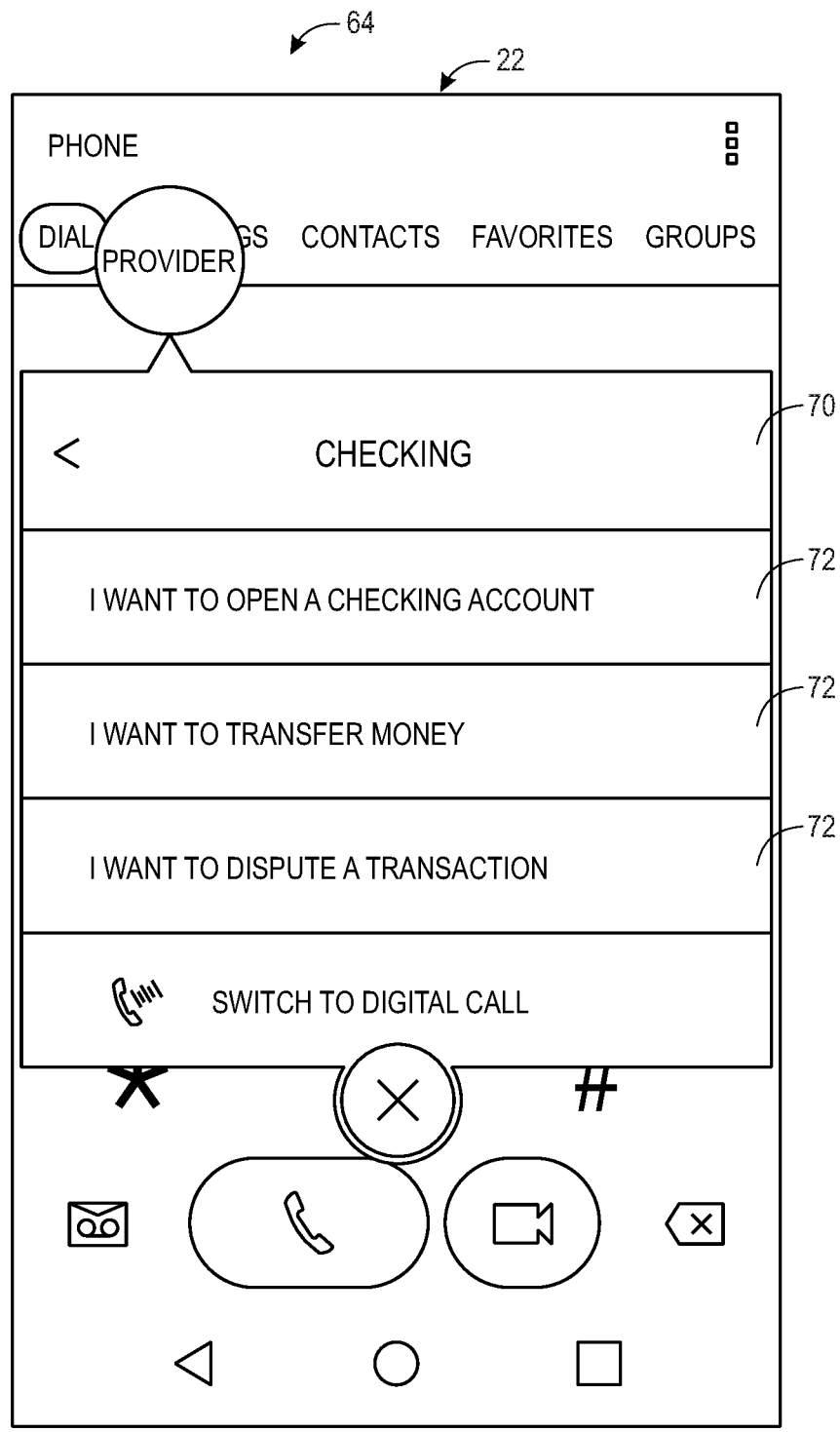
FIG. 5 is an example page of the visual interface displayed on the display of the electronic device of FIG. 1 that facilitates establishing communication with a relevant provider department or performing a transaction, according to an embodiment of the present disclosure.

In some embodiments, the controller 14 may receive an indication associated with establishing communication with the relevant provider department or performing the transaction via the visual interface 64. For example, the user may select the "Checking" option 66 from the page 62. FIG. 5 is an example page 70 of the visual interface 64 displayed on the display 22 of the electronic device 12 of FIG. 1 that facilitates establishing communication with the relevant provider department or performing the transaction, according to an embodiment of the present disclosure. After the user selects the "Checking" option 66 from the page 62, the controller 14 may display the page 70. As illustrated, the page 70 includes a set of options 72 that the user may select from to facilitate establishing communication with the relevant provider department or performing the transaction. In particular, the set of options 72 includes "I want to open a checking account," "I want to transfer money," and "I want to dispute a transaction." It should be understood that any suitable options related to the business of the provider may be included.

Figure 6:
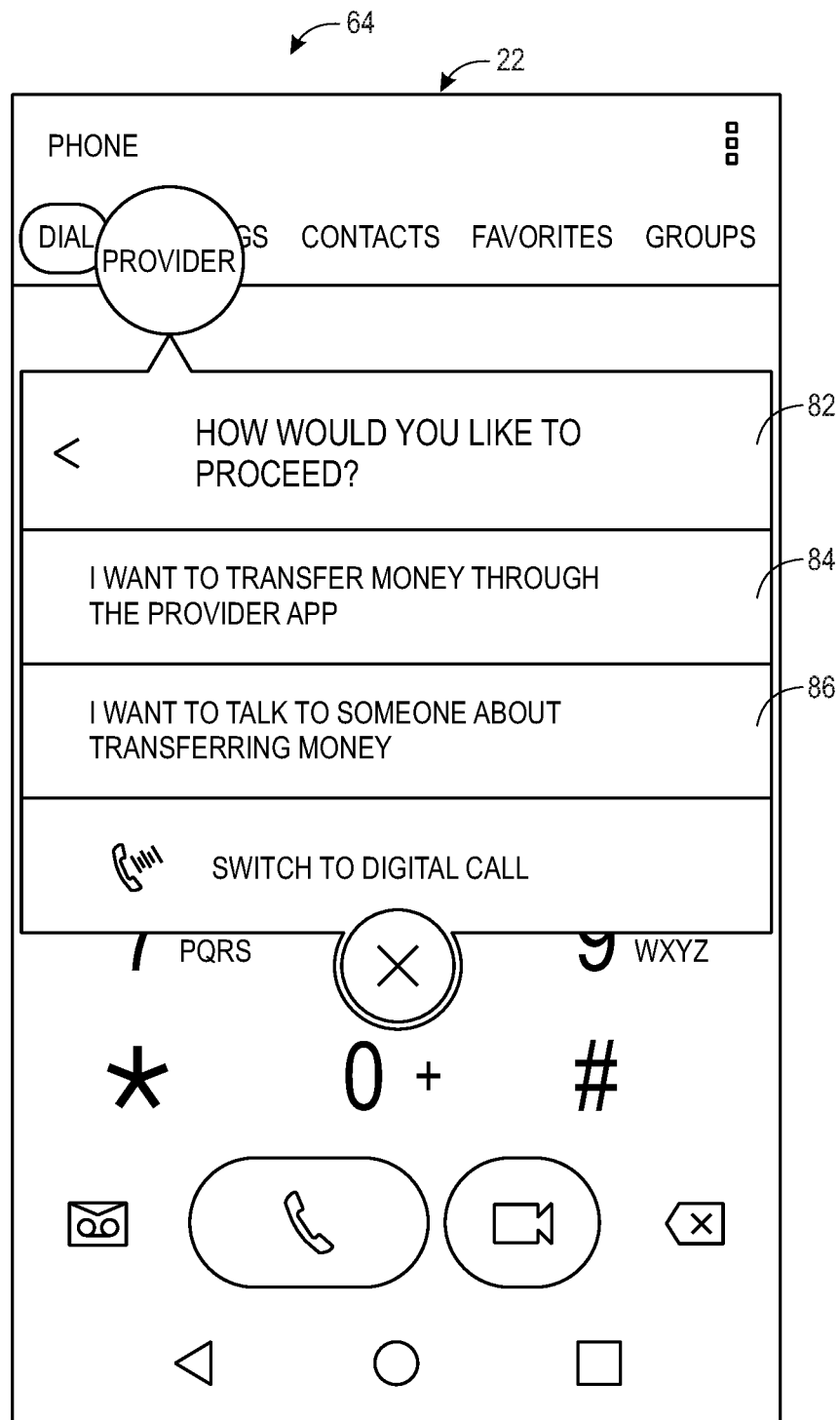
FIG. 6 is an example page of the visual interface displayed on the display of the electronic device of FIG. 1 that enables receiving the indication associated with establishing communication with the relevant provider department or performing the transaction via the visual interface, according to an embodiment of the present disclosure.

The controller 14 receives (process block 80) an indication associated with performing the action associated with the provider via the visual interface. In particular, the indication may be associated with establishing communication with the relevant provider department or performing the transaction via the visual interface 64. For example, the visual interface 64 may provide an option for the user to establish communication with the relevant provider department or perform the transaction via the visual interface 64, among others. FIG. 6 is an example page 82 of the visual interface 64 displayed on the display 22 of the electronic device 12 of FIG. 1 that enables receiving the indication associated with establishing communication with the relevant provider department or performing the transaction via the visual interface 64, according to an embodiment of the present disclosure. Specifically, the page 82 includes an "I want to transfer money through the Provider app" option 84 that enables the user to perform the transaction via the visual interface 64. The page 82 also includes an "I want to talk to someone about transferring money" option 86 that enables establishing communication with the relevant provider department (e.g., money transfer department, checking department, and the like). When the user selects one of the options, the controller 14 receives the indication associated with establishing communication with the relevant provider department or performing the transaction via the visual interface 64. It should be understood that any suitable options related to the business of the provider may be included.

Figure 7:
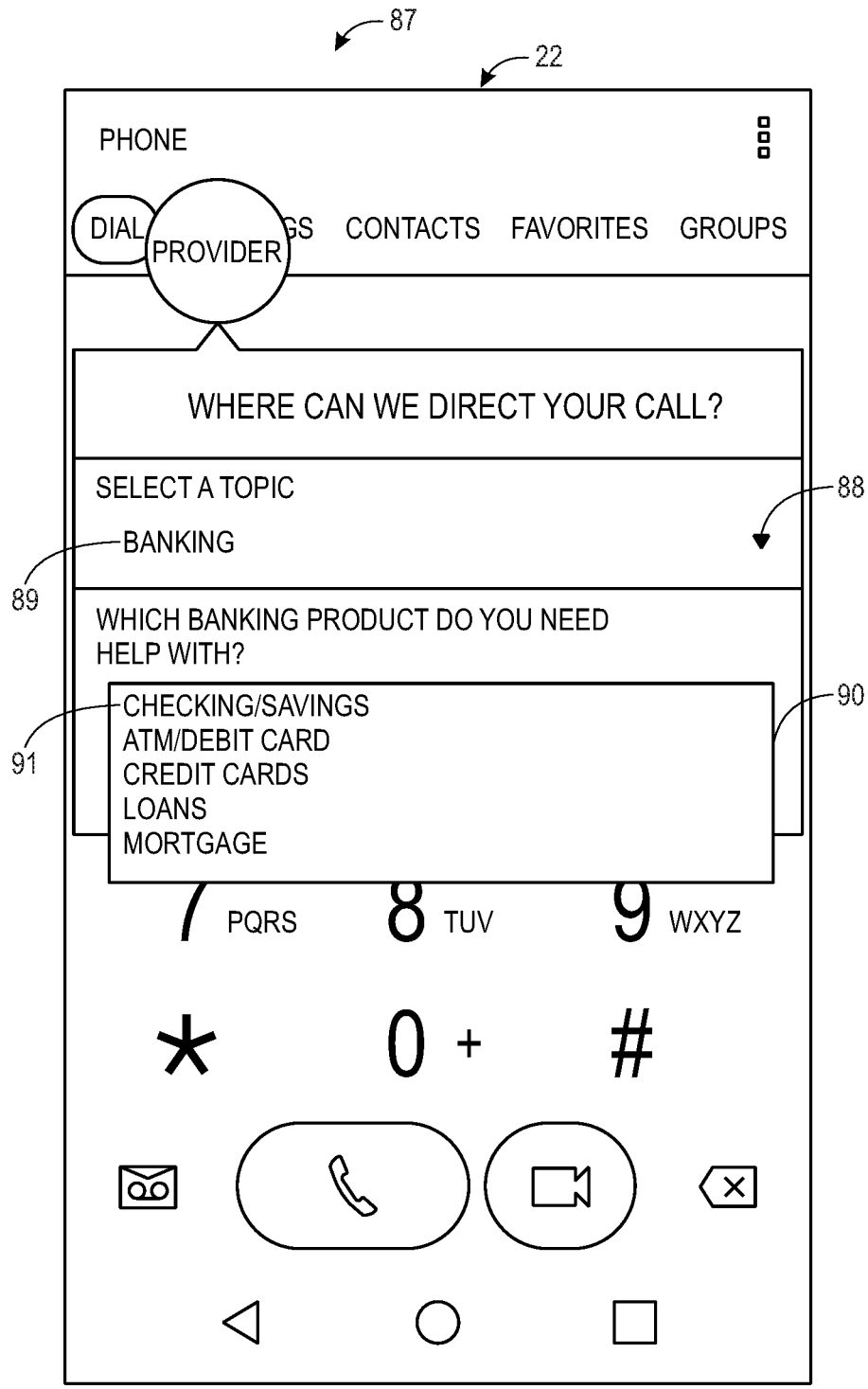
FIG. 7 is another example page of the visual interface displayed on the display of the electronic device of FIG. 1 that facilitates establishing communication with the relevant provider department or performing the transaction, according to an embodiment of the present disclosure.

Alternatively or additionally, FIG. 7 is another example page 87 of the visual interface 64 displayed on the display 22 of the electronic device 12 of FIG. 1 that facilitates establishing communication with the relevant provider department or performing the transaction, according to an embodiment of the present disclosure. The page 87 may include a topic selection control 88 that enables the user to select a topic 89. The topic 89 may correspond to the business and/or departments of the provider, such as "Banking," "Insurance," "Credit Cards," "Something Else," and/or similar topics. The page 87 may also include a subtopic selection control 90 that enables the user to select a subtopic 91. In some embodiments, the subtopics 91 in the subtopic selection control 90 may be populated based on selection of the topic 89 (e.g., by the user) in the topic selection control 88. The subtopics 91 may correspond to facilitate establishing communication with a relevant provider department or performing a transaction. As illustrated, the subtopics 91 provided in the subtopic selection control 90 include "Checking/Savings," "ATM/Debit Card," "Credit Cards," "Loans," and "Mortgage." It should be understood that any suitable subtopics 91 related to the business of the provider may be included. Moreover, while the topic selection control 88 and the subtopic selection control 90 are provided in the form of drop-down menus, any suitable control may be used.

Figure 8:
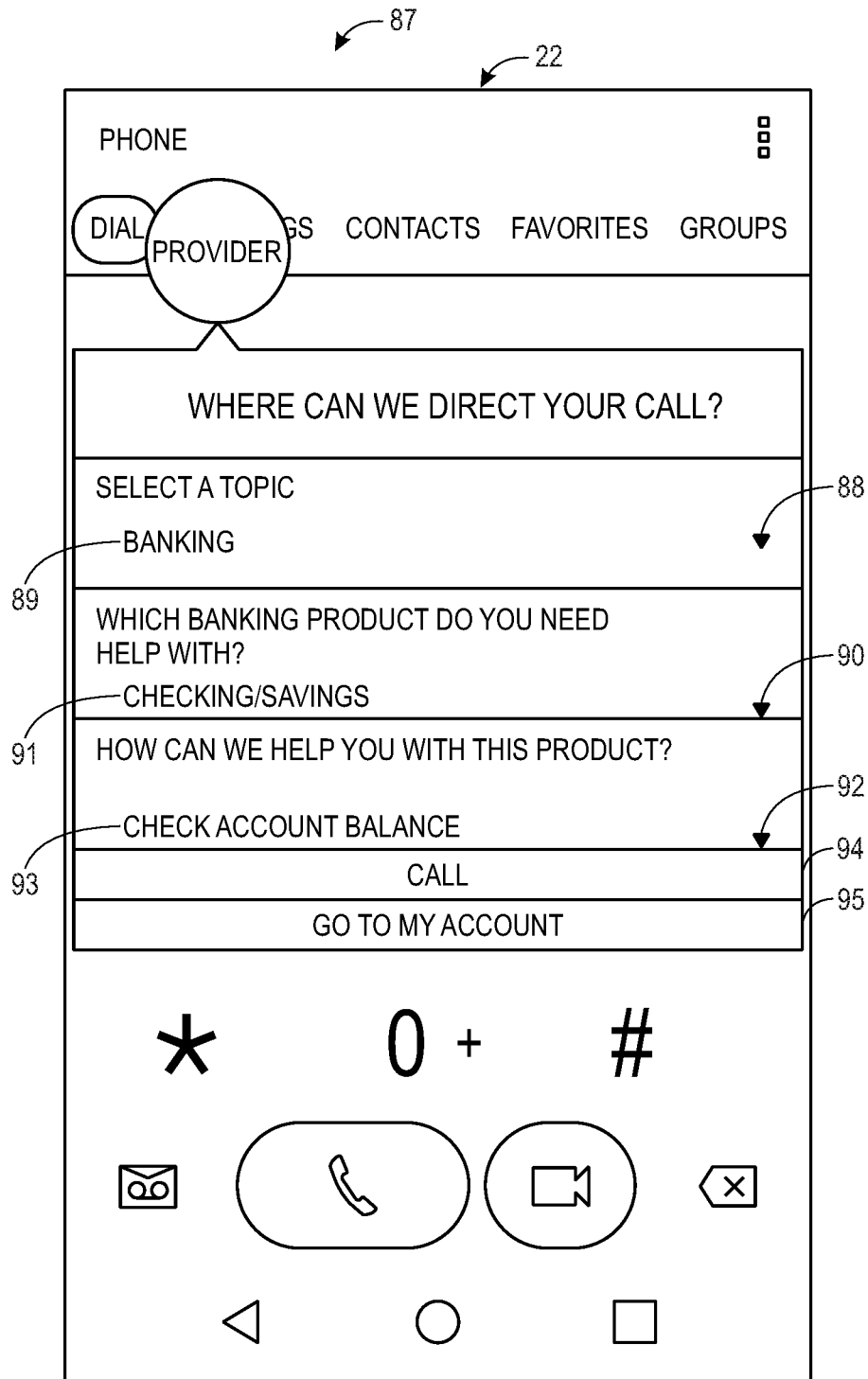
FIG. 8 is an example page resulting from selection of a subtopic from the example page of FIG. 7, according to an embodiment of the present disclosure.

FIG. 8 is the example page 87 of FIG. 7 resulting from selection of a subtopic 91, according to an embodiment of the present disclosure. In particular, the subtopic 91 "Checking/Savings" has been selected. As illustrated, the page 87 includes an option selection control 92 that enables selection of an option 93 (similar to the options 72 as illustrated in FIG. 5) that facilitates establishing communication with a relevant provider department or performing a transaction. In some embodiments, the options 93 in the option selection control 92 may be populated based on selection of the subtopic 91 (e.g., by the user) in the subtopic selection control 90. In particular, the "Check Account Balance" option 93 has been selected. The options 93 may include any suitable options related to the business of the provider. As illustrated, the page 87 includes a first action button 94 and a second action button 95. The action buttons 94, 95 may enable the user to perform actions related to establishing communication with a relevant provider department or performing a transaction. For example, the first action button 94 ("Call") may enable the user to call (e.g., via a telephone network) a relevant provider department. The second action button 95 ("Go To My Accounts") may enable the user to view and/or manage one or more bank accounts the user may have with the provider. It should be understood that the actions represented by the action buttons 94, 95 may include any suitable action to the business of the provider.

Figure 9:
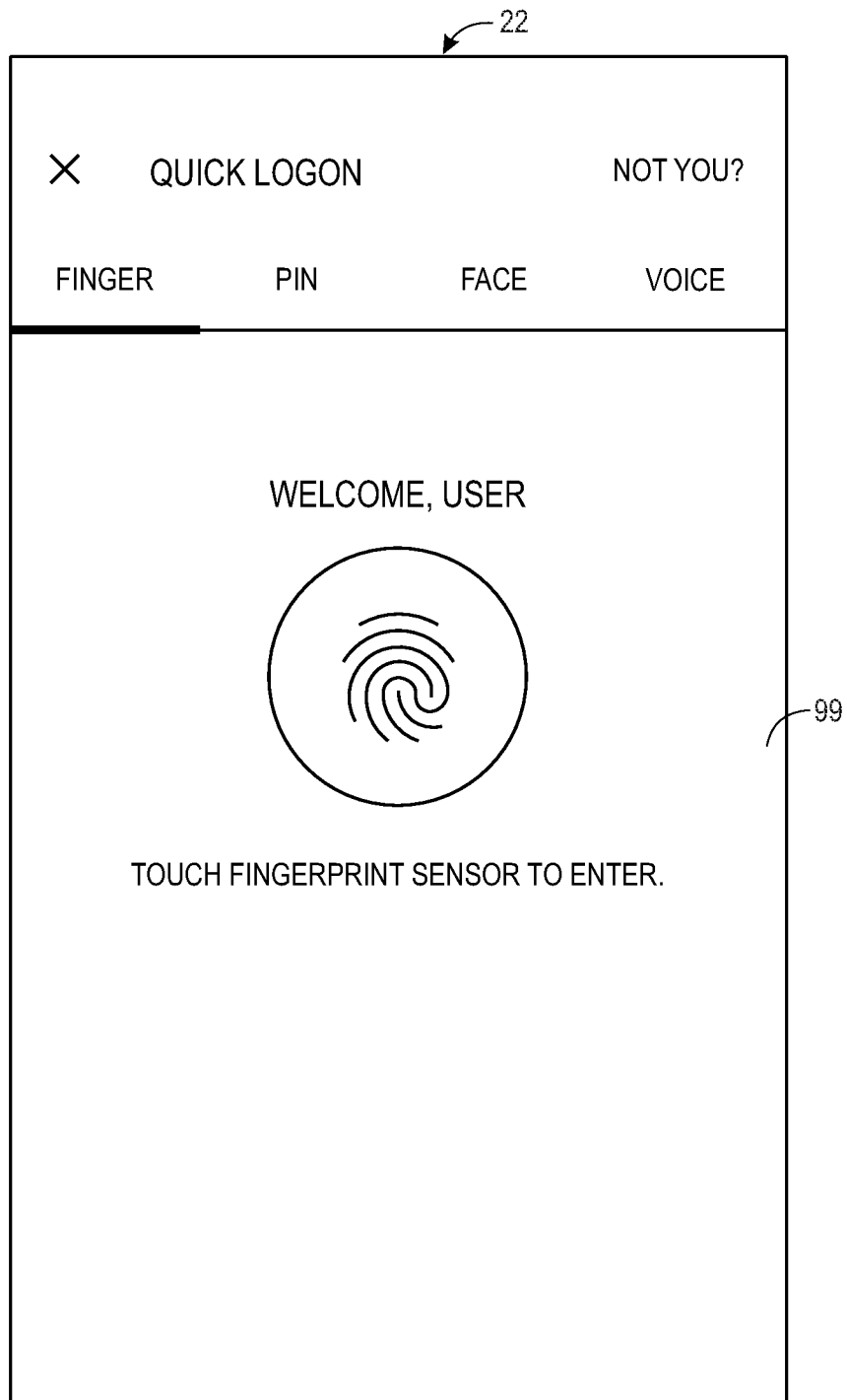
FIG. 9 represents a visual display of a prompt of an authentication feature of the electronic device of FIG. 1, according to an embodiment of the present disclosure.

The controller 14 then authenticates (process block 98) the user. Specifically, the controller 14 may use the authentication feature 24 of the electronic device 12 to authenticate the user. FIG. 9 represents a visual display of a prompt 99 of the authentication feature 24 of the electronic device 12 of FIG. 1, according to an embodiment of the present disclosure. In particular, the authentication feature 24 includes a fingerprint reader that is built-in hardware of the electronic device 12. In additional or alternative embodiments, any other suitable authentication feature 24 may be used, such as a microphone, a retinal scanner, a facial recognition camera, or any other suitable hardware that enables authentication of the user. In one embodiment, the authentication feature 24 may be implemented as software, such as a prompt that enables the user to enter a personal identification number, a password, answer a security question, draw a security pattern, and the like. The controller 14 may proceed to the next step of the method 40 if the user has been authenticated. If the user is not authenticated, in some embodiments, the controller 14 may alert the provider, lock the electronic device 12, exit the visual interface 64, provide a threshold number of authentications before any of the previous actions, and the like.

Figure 10:
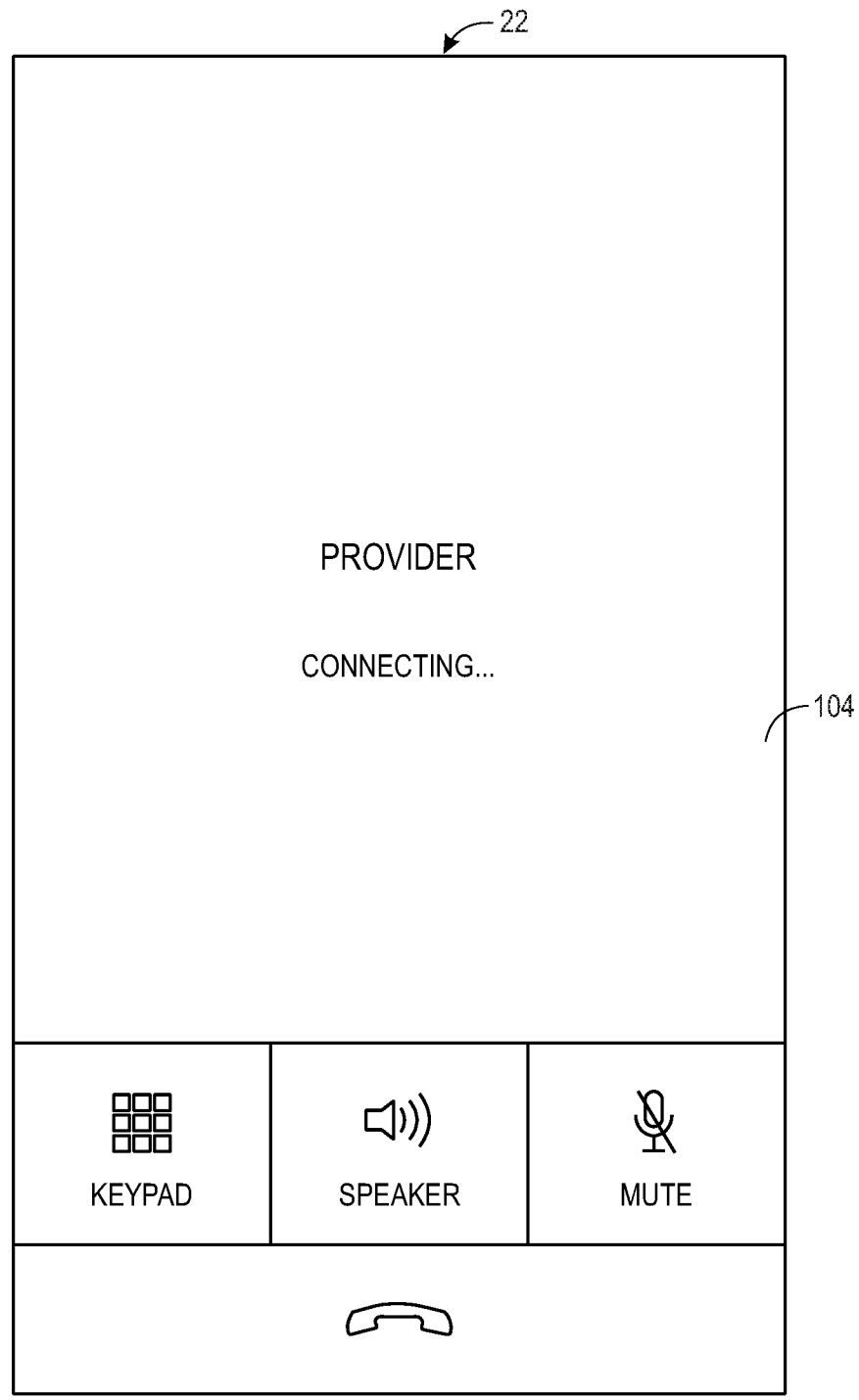
FIG. 10 is a call screen of the display of the electronic device of FIG. 1, according to an embodiment of the present disclosure.

The controller 14 determines (decision block 100) whether the indication associated with establishing communication with the relevant provider department or performing the transaction via the visual interface 64 (from process block 80) is associated with establishing communication with the relevant provider department. If so, the controller 14 establishes (process block 102) communication with the relevant provider department. For example, the controller 14 may connect the user to the relevant provide department via a telephone network (e.g., make a telephone call to the relevant provide department). FIG. 10 is a call screen 104 of the display 22 of the electronic device 12 of FIG. 1, according to an embodiment of the present disclosure.

Figure 11:
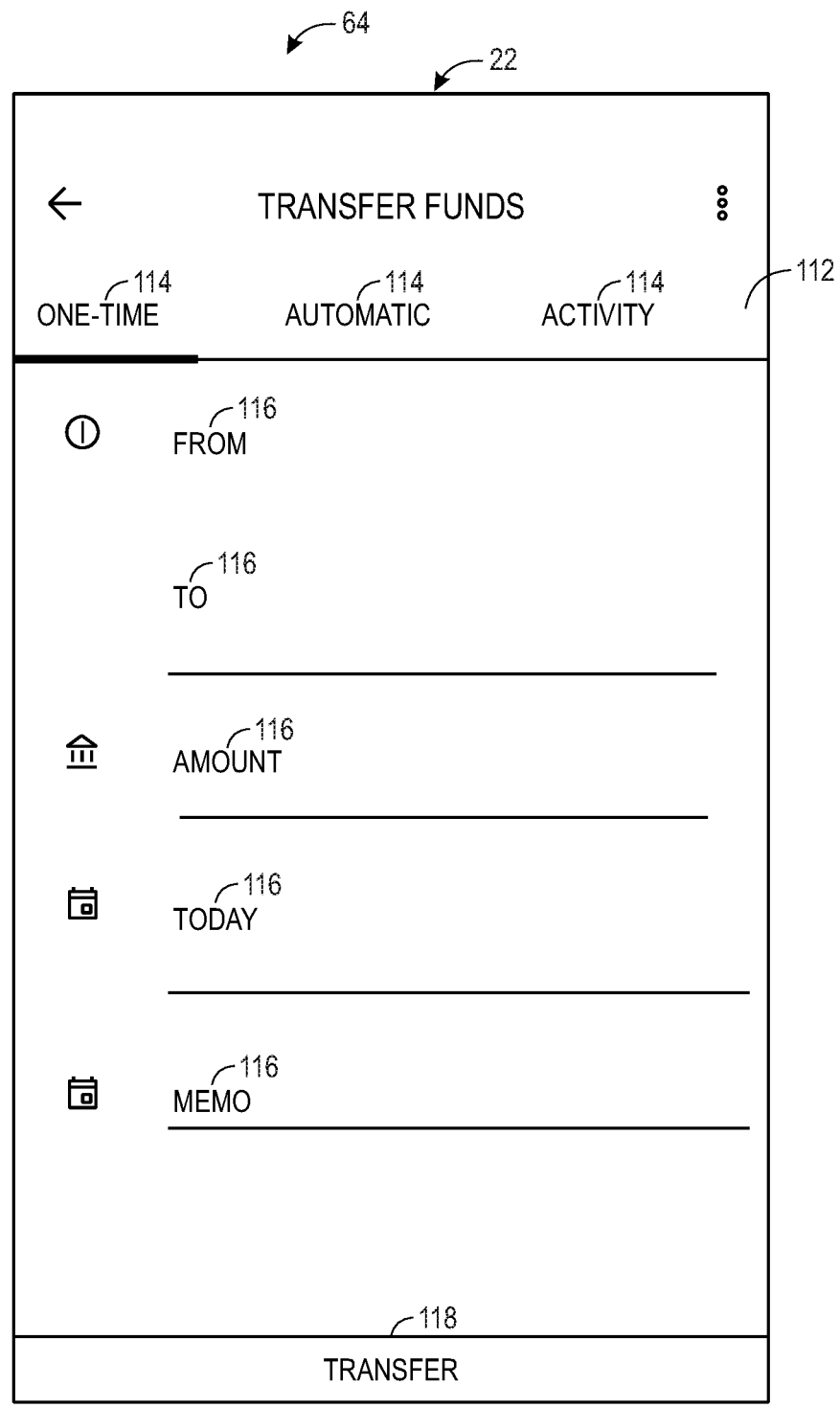
FIG. 11 is an example page of the visual interface displayed on the display of the electronic device of FIG. 1 that enables the user to perform the transaction via the visual interface, according to an embodiment of the present disclosure.

If the controller 14 determines that the indication associated with establishing communication with the relevant provider department or performing the transaction (from process block 80) is not associated with establishing communication with the relevant provider department, the controller 14 enables (process block 110) performing the transaction via the visual interface 64. In some embodiments, the controller 14 may determine that the indication is associated with performing the transaction via the visual interface 64. FIG. 11 is an example page 112 of the visual interface 64 displayed on the display 22 of the electronic device 12 of FIG. 1 that enables performing the transaction via the visual interface 64, according to an embodiment of the present disclosure. Specifically, the page 112 includes subpages 114 (e.g., "One-time," "Automatic," and "Activity") that enable defining the type of transaction to be performed. It should be understood that any suitable subpages related to the business of the provider may be included. Moreover, in some embodiments, subpages may not be used on the page 112. The page 112 also includes fields 116 (e.g., "From," "To," "Amount," a date field, and "Memo") that enable defining details of the transaction. It should be understood that any suitable fields related to the business of the provider may be included. Once the relevant fields have been entered, the "Transfer" button may be selected to perform or complete the transaction. In this manner, establishing communication to a relevant provider department and/or performing a desired transaction may more quickly and efficiently be achieved without tediously navigating through an interactive voice response system. Thus, present embodiments may improve computer-based operations and address Internet-centric problems associated with navigating automated interactive sessions.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. One or more tangible, non-transitory, machine-readable media comprising instructions that, when executed by a processor, cause the processor to:
receive an attempt to make a telephone call via an electronic device;
detect that the telephone call is directed to an entity based on call data received by the electronic device;
in response to detecting that the telephone call is directed to the entity, prevent the telephone call from being completed via the electronic device;
after detecting that the telephone call is directed to the entity, display a visual interface on an electronic display of the electronic device, wherein the visual interface comprises a prompt for an authentication process; and
perform the authentication process using a biometric reader of the electronic device.

2. The one or more tangible, non-transitory, machine-readable media of claim 1, wherein the instructions cause the processor to enable selection of a department of the entity from a plurality of departments of the entity.

3. The one or more tangible, non-transitory, machine-readable media of claim 2, wherein the instructions cause the processor to enable the selection of the department of the entity via the visual interface.

4. The one or more tangible, non-transitory, machine-readable media of claim 2, wherein the instructions cause the processor to establish communication with the department in response to receiving an indication of the selection of the department.

5. The one or more tangible, non-transitory, machine-readable media of claim 1, wherein the instructions cause the processor to perform a transaction associated with the entity.

6. The one or more tangible, non-transitory, machine-readable media of claim 5, wherein the instructions cause the processor to transfer funds, change a policy, make a payment, or any combination thereof.

7. The one or more tangible, non-transitory, machine-readable media of claim 5, wherein the instructions cause the processor to perform the transaction associated with the entity via the visual interface.

8. An electronic device comprising:
a display; and
a controller communicatively coupled to the display, wherein the controller comprises a processor and a memory, wherein the memory comprises processor-executable instructions that, when executed by the processor, cause the processor to:
detect a target of an outgoing request to communicate via a first mode of operation;
suspend the outgoing request to communicate via the first mode of communication based on the target;
provide a second mode of communication different from the first mode of communication;
display a visual interface via the second mode of communication, wherein the visual interface comprises a prompt for an authentication process; and
perform the authentication process using a biometric reader of the electronic device.

9. The electronic device of claim 8, wherein the processor-executable instructions cause the processor to suspend an outgoing text message transmitted using a telephone network.

10. The electronic device of claim 8, wherein the biometric reader comprises a fingerprint reader, a microphone, a retinal scanner, or any combination thereof.

11. The electronic device of claim 8, comprising software, wherein the processor-executable instructions cause the processor to perform the authentication process using the software, wherein the software enables entry of a personal identification number, a password, an answer to a security question, a drawing of a security pattern, or any combination thereof.

12. The electronic device of claim 8, wherein the processor-executable instructions cause the processor to display the visual interface comprising displaying a page configured to enable selection of a service provider department from a plurality of service provider departments.

13. The electronic device of claim 12, wherein the page comprises a topic selection control, wherein the processor-executable instructions cause the processor to populate the topic selection control with a plurality of topics based on the selection of the service provider department.

14. The electronic device of claim 13, wherein the processor-executable instructions cause the processor to populate the topic selection control with a second plurality of topics based on a second selection of a second service provider department of the plurality of service provider departments, wherein the second plurality of topics is different from the plurality of topics.

15. The electronic device of claim 13, wherein the page comprises an option selection control, wherein the processor-executable instructions cause the processor to populate the option selection control with a plurality of options based on a second selection of a topic of the plurality of topics, wherein each option of the plurality of options facilitate performing a transaction with the service provider department.

16. A method of operation of a personal communication system, comprising:
    detecting, with one or more processors, an attempted outgoing communication to a particular entity via a first mode of communication;
    in response to detecting the attempted outgoing communication to the particular entity, blocking, with the one or processors, the attempted outgoing communication to the particular entity via the first mode of communication;
    after detecting the attempted outgoing communication to the particular entity, with the one or more processors:
        initiating a second mode of communication different from the first mode of communication, displaying a visual interface on an electronic display via the second mode of communication, wherein the visual interface comprises a prompt for an authentication process; and
    performing the authentication process using a biometric reader of the electronic device.

17. The method of claim 16, comprising directing, with the one or more processors, a telephone call to a service provider department among a plurality of service provider departments.

18. The method of claim 16, comprising blocking, with the one or more processors, a telephone call to a service provider via a telephone network.

19. The method of claim 18, comprising displaying a dial pad on the electronic display, wherein the telephone call is entered via the dial pad.

20. The method of claim 19, comprising displaying the visual interface by overlaying the visual interface over the dial pad.

* * * * *